United States Patent
Yoshida et al.

(10) Patent No.: US 7,020,163 B2
(45) Date of Patent: Mar. 28, 2006

(54) FRAME COMMUNICATION SYSTEM

(75) Inventors: Toshiyuki Yoshida, Fukuoka (JP);
Takeo Kubo, Fukuoka (JP); Takaharu Kajiwara, Fukuoka (JP); Tsuyoshi Matsumoto, Kawasaki (JP); Hidetoshi Amari, Kawasaki (JP); Masashi Hirome, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 962 days.

(21) Appl. No.: 10/059,803

(22) Filed: Jan. 29, 2002

(65) Prior Publication Data

US 2002/0085570 A1   Jul. 4, 2002

Related U.S. Application Data

(63) Continuation of application No. PCT/JP99/04152, filed on Aug. 2, 1999.

(51) Int. Cl.
*H04L 12/28* (2006.01)
*H04M 3/22* (2006.01)

(52) U.S. Cl. .................... 370/474; 370/404; 379/27.01

(58) Field of Classification Search .......... 370/230.01, 370/231, 352, 389, 279, 404, 395.21, 466, 370/474; 379/9, 12, 22, 27.01, 29
See application file for complete search history.

(56) References Cited

U.S. PATENT DOCUMENTS 5,473,665 A * 12/1995 Hall et al. ............... 379/27.01

FOREIGN PATENT DOCUMENTS

| JP | 62-220049 | | 9/1987 |
| JP | 03-006924 | | 1/1991 |
| JP | 03-198432 | | 8/1991 |
| JP | 10-164172 | | 6/1998 |
| JP | 63209237 | * | 8/1998 |

* cited by examiner

*Primary Examiner*—Afsar Qureshi
(74) *Attorney, Agent, or Firm*—Katten Muchin Rosenman LLP

(57) ABSTRACT

The present invention relates to a frame communication system composed of a code converter and a frame generator/decomposer. In order to improve a line efficiency without encapsulating transmitting data, a code converter in a frame transmitting device converts at least different specific codes X and Y within the transmitting data respectively into codes (Y, A) and (Y, B) composed of the code Y and at least specific codes A and B different from each other, and a frame generator prepares a frame of the transmitting data with the code X as a frame boundary. A frame decomposer in a frame receiving device recognizes a specific code X as a frame boundary to decompose receiving data, and a code converter converts codes (Y, A) and (Y, B) within the receiving data composed of a specific code Y, and specific codes A and B into codes X and Y.

16 Claims, 16 Drawing Sheets

| BEFORE CODE CONVERSION | AFTER CODE CONVERSION |
|---|---|
| XXh | YY01h |
| XXXXh (XXh 2 CONSECUTIVE TIMES) | YY02h |
| · | · |
| · | · |
| · | · |
| XX · · XXh (XXh 255 CONSECUTIVE TIMES) | YYFFh |
| YYh | YY00h |

FIG.1

| BEFORE CODE CONVERSION | AFTER CODE CONVERSION |
|---|---|
| XXh | YY01h |
| XXXXh (XXh 2 CONSECUTIVE TIMES) | YY02h |
| ⋮ | ⋮ |
| XX··XXh (XXh 255 CONSECUTIVE TIMES) | YYFFh |
| YYh | YY00h |

FIG.2

| BEFORE CODE CONVERSION | AFTER CODE CONVERSION | PROCESS AT PARITY COMPUTATION |
|---|---|---|
| XXh | YY01h | COMPUTE AS XXh |
| XXXXh (XXh 2 CONSECUTIVE TIMES) | YY02h | NOT COMPUTE |
| ⋮ | ⋮ | WHEN ○○ VALUE IN DATA YY○○h AFTER CODE CONVERSION IS ODD, COMPUTE YY○○h AS XXh; WHEN EVEN, NOT COMPUTE YY○○h. |
| XX··XXh (XXh 255 CONSECUTIVE TIMES) | YYFFh | COMPUTE AS XXh |
| YYh | YY00h | COMPUTE WITHOUT CHANGES |

FIG. 18A  FRAME FROM ACCOMMODATED LINE
PRIOR ART
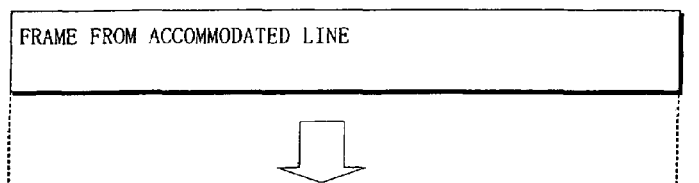
FIG. 18B  ADD CHECK DATA
PRIOR ART
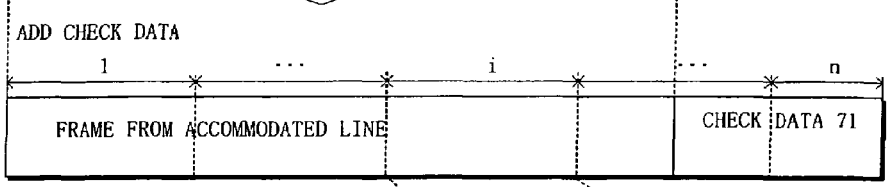
FIG. 18C  ENCAPSULATE & ACCOMMODATE
PRIOR ART
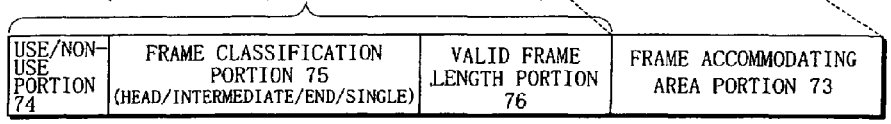

FRAME COMMUNICATION SYSTEM

This application is a continuation of PCT/JP99/04152 filed on Aug. 2, 1999.

BACKGROUND OF THE INVENTION

1. Field of the Invention

The present invention relates to a frame communication system, and in particular to a frame communication system composed of a code converter and a frame generator/decomposer.

Recently, developments in a communication field have been remarkable so that even for information transfer, an essentially different cell-based transfer mode has been newly adopted in addition to the prior art character-based or frame-based transfer mode. In any transfer mode, it is important to efficiently transmit, data, and even in the most basic frame-based transfer mode an efficient data transfer between e.g. different frame-based transfer modes is required.

2. Description of the Related Art

FIG. 15 shows an arrangement of the prior art network. This network is composed of interface nodes 41_1–41_5 (occasionally represented by a reference numeral 41) connected with a 50M ring-like transmission line 40, Ethernets 44_1–44_6 connected to the interface nodes 41_1–41_5.

The interface node 41 is composed of a synchronous line multiplexer 42 and an Ethernet accommodation LS (Line Set) 43.

The Ethernet 44_1, for example, is connected to the Ethernet 44_6 through the interface node 41_1, the 50M ring transmission line 40, and the interface node 41_5. The Ethernet accommodation LS 43 of the interface node 41_1 is connected to the Ethernet accommodation LS 43 of the interface node 41_5 by a P—P connection (point to point connection).

FIG. 16 shows an arrangement of the interface node 41_1 and the 50M ring transmission line 40 shown in FIG. 15 in more detail. The 50M ring transmission line 40 is composed of a #0 system optical transmission line 40_1 and a #1 system optical transmission line 40_2. The synchronous line multiplexer 42 is composed of a #0 optical IF 42_1, a #1 optical IF 42_2, and a control-monitor clock portion 45. The Ethernet accommodation LS 43 is composed of terminal IF portions (interfaces) 43_1, 43_2, etc.

The #0 optical IF 42_1 and the #1 optical IF 42_2 are composed of an O/E•E/O converter 51, an SDH processor 52, a line multiplexer 53, an FIFO 54, and an 8-1 SEL portion (selector) 55. The control-monitor clock portion 45 is composed of a PLO (Phase Locked Oscillator) 56 and a controller-monitor 57. The terminal IF portions 43_1 and 43_2 are composed of an HW interface 61 connected to the, synchronous line multiplexer 42, a terminal interface 62 connected to the Ethernet 44, and a controller-monitor 63.

In operation, after optoelectronic conversion is performed at the O/E•E/O converter 51 to the data on an SDH frame of e.g. the #0 system optical transmission line 40_1, the data are sent to the terminal interface 62 through the SDH processor 52, the line multiplexer 53, and the HW interface 61 of the terminal IF portion 43_1. At the terminal interface 62, the data are put on an Ethernet frame to be transmitted to the Ethernet 44_1.

On the other hand, the data on the frame of the Ethernet 44_1 are transmitted to the O/E•E/O converter 51 through the terminal interface 62, the HW interface 61, the 8-1 SEL portion 55 of the #0 optical IF portion 42_1, the line multiplexer 53, and the SDH processor 52. Then, electrooptic conversion is performed to the data at the O/E•E/O converter 51, so that the data are carried on the SDH frame of the #0 system optical transmission line 40_1.

FIG. 17 shows the terminal IF portion (Ethernet accommodation LS) 43 shown in FIG. 16 in more detail.

This Ethernet accommodation LS 43 composes a transmission interface by a line IF portion 10, a check data generator 11, a transmitting buffer 13, a transmitting buffer write controller 14, a transmitting buffer read controller 15, a data checker 16, and a capsule disassembler 19.

Also, the Ethernet accommodation LS 43 composes a reception interface by a capsule assembler 38, a data checker 32, a receiving buffer 34, a receiving buffer write controller 35, a receiving buffer read controller 36, a data checker 37, and a line IF portion 10.

Furthermore, the Ethernet accommodation LS 43 has an available bandwidth enable generator 23 and an available bandwidth setter 24 common to both of the transmitting and the receiving sides.

In operation, the line IF portion 10 receives a variable length frame from an accommodated line to be converted into an NRZ (Non Return Zero) signal. Then, the signal is outputted as transmitting data to the transmission line side.

The check data generator 11 adds check data to the transmitting data. The transmitting buffer write controller 14 performs a control to write the data in the transmitting buffer 13 for rate conversion.

The available bandwidth enable generator 23 generates an available bandwidth enable signal 84 based on a setting value 96 preset at the available bandwidth setter 24, a transmitter frame pulse 88, and a transmission line clock 89. This signal 84 enables the transmitting buffer read controller 15 to control reading the data from the transmitting buffer 13 so that the data checker 16 checks the read data.

The capsule disassembler 19 encapsulates the read data based on the enable signal 84 to provide the transmission line output data 87. Thus, the variable length frame on the accommodated line is encapsulated and accommodated in the available bandwidth of the transmission line.

FIGS. 18A–18C show a concept of a check data addition and encapsulation. FIG. 18A shows a variable length frame from the accommodated line. FIG. 18B shows a variable length frame to which check data 71 such as horizontal parity or CRC are added.

This variable length frame is disassembled, and then encapsulated. FIG. 18C shows a capsule of the i-th disassembled portion, which is composed of a header portion 72 and a frame accommodating area portion 73.

The header portion 72 is further composed of a use/non-use portion 74, a frame classification portion 75, and a valid frame length portion 76. The use/non-use portion 74 indicates whether or not there is an Ethernet frame to be accommodated on the transmission line. The frame classification portion 75 indicates whether the data of the frame accommodating area portion 73 include the head of the frame, the intermediate portion of the frame, or the end of the frame, or assume a single frame.

The valid frame length portion 76 includes the information indicating up to where in the frame accommodating area portion 73 the valid data exist, the information being valid only when it is accommodated at the end frame or a single frame.

The frame accommodating area portion 73 accommodates actual data such as a frame from the accommodated line and check data.

FIG. 19 shows an STM0/OC1 frame format of a well-known SDH/SONET. This frame is composed of an SOH portion of 9 lines and 3 rows, a POH portion of 9 lines and 1 row, and a payload portion of 9 lines and 86 rows. The payload portion is composed of byte batch time slots TS0–TS85, TS90–TS175, . . . , TS720–TS805.

For example, the variable length frame of the Ethernet is preliminarily allocated with 5 bytes TS91–TS95 for an accommodated area. This allocation can be performed by the control/monitor terminal shown in FIG. 15.

In FIG. 17, the capsule assembler 37 assembles the encapsulated transmission line input data 90, and then instructs the receiving buffer write controller 35, based on the available bandwidth enable signal 92, to perform a control in order to write the assembled data in the receiving buffer 34. At this time, the data checker 32 performs data check for the assembled data.

The receiving buffer read controller 36 controls reading the data from the receiving buffer 34 so that the read data are transmitted to the line IF portion 10 through the data checker 37. At this time, the data checker 37 performs error check for the read data.

The line IF portion 10 accommodates the received data in the Ethernet frame to be transmitted to the accommodated line.

In such a prior art frame communication system, an overhead such as a header for encapsulation worsens the line efficiency.

SUMMARY OF THE INVENTION

It is accordingly an object of the present invention to provide a frame communication system, especially composed of a code converter and a frame generator/decomposer, which improves the line efficiency without encapsulation.

(1) In order to achieve the above-mentioned object, a frame transmitting device according to the present invention comprises: a code converter for converting at least different specific codes X and Y within transmitting data composed of n-bit codes, where "n" is a natural number $\geq 2$, respectively into codes (Y, A) and (Y, B) composed of the code Y and at least specific m-bit codes A and B different from each other, where "m" is a natural number $\geq 1$; and a frame generator for preparing a frame of the transmitting data with the code X as a frame boundary.

This will be described referring to a conversion table example of a code converter in a frame transmitting device according to the present invention shown in FIG. 1. In this example, "n" bits and "m" bits are both 8 bits, so that transmitting data are composed of 8-bit codes, 00h (h: hexadecimal, hereinafter occasionally omitted), 01h, . . . , FFh.

The code converter converts specific codes XXh and YYh (for example, 00h and 08h) within inputted codes into 16-bit codes YYAAh and YYBBh (0801h and 0800h) obtained by adding 8-bit codes AAh and BBh (for example, 01h and 00h) to the codes XXh and YYh, so that the 16-bit codes are outputted. The codes other than the codes XXh and YYh are outputted as an 8-bit code without being converted. As a result, in the codes after the conversion, 8-bit codes and 16-bit codes coexist. However, the code XXh is not included.

Therefore, a frame generator generates a frame of the transmitting data with the code XXh (=00h) as a frame boundary code.

Thus, it becomes possible to inform the boundary of the transmitting data to a receiving side without adding a header, so that an encapsulation becomes unnecessary and the line efficiency can be improved.

It is to be noted that XXXXh, . . . , and XX . . . XXh (XXh consecutive 255 times) will be described later.

While it is also possible to set bit numbers "n" and "m" not to "8" but to "16" or "2" bits, multiples of 8 bits with a good processing efficiency may be generally adopted.

It is further possible to provide codes (Y, A)–(Y, B) composed of more than three specific codes X-Y and more than three specific codes A-B.

Thus, it becomes possible to transmit special data (e.g. empty data) other than the boundary code in distinction from the transmitting data.

(2) Also, the frame transmitting device according to the present invention, when the code X is made consecutive "i" times, where "i" is a natural number $\geq 1$, the code converter may convert the code X into a code (Y, C) composed of the code Y and an m-bit code C corresponding to the number "i".

The present invention in case of "n"=8 and "m"=8 will be described referring to FIG. 1. When receiving a single, inconsecutive, code X (=XXh), the code converter converts the code X into a code YY01h composed of an 8-bit code Y (=YYh) and e.g. code C (=01h) corresponding to the number, 1.

When receiving a code XXXXh where the code XXh is made consecutive 2 times, the code converter converts the code into a code YY02h composed of the code YYh and a code 02h corresponding to the number, 2. Hereafter, when receiving a code XX . . . XXh where the code XXh is made consecutive 255 (0FFh) times, the code converter converts the code into a code YYFFh in the same manner.

Thus, when the code X is made consecutive, it can be converted into data with smaller bit number, thereby enabling the line efficiency to be improved.

It is to be noted that in the above example 01h–0FFh indicating the number as it is are used as a code C indicating the number. However, the code C may be a code to which the correspondence with the number is preset. Also, the bit number "m" of the code C need not be the same as the bit number "n" of the code X.

(3) Also, in the frame transmitting device according to the present invention, when the code Y is made consecutive "j" times, where "j" is a natural number $\geq 1$, the code converter may convert the code Y into a code (Y, D) composed of the code Y and an m-bit code D corresponding to the number "j" other than the code C.

Namely, in the above-mentioned (2) the code converter converts the code X made consecutive 2–127 times into e.g. YY02h–YY7Fh. However, in the present invention the code converter can further convert the code Y (=YYh) made consecutive 2–127 times respectively into e.g. YY80h–YYFFh.

Thus, when the code Y is made consecutive, the code can be converted into data with smaller bit number, thereby enabling the line efficiency to be improved.

(4) Also, the frame transmitting device according to the present invention may further comprise: a horizontal parity generator for adding horizontal parity to the transmitting data before a code conversion; and a horizontal parity checker for regarding the code (Y, C) as the code X itself to be included in a parity computation only when the code C after the code conversion indicates an odd number.

Namely, a horizontal parity generator adds horizontal parity to the transmitting data. The code converter performs a code conversion to the transmitting data to which this horizontal parity is added.

A horizontal parity checker inputs the transmitting data including the code after the code conversion shown in FIG. 2 and performs a horizontal parity check as follows: When receiving the code (Y, C) including the code C (01h–FFh) indicating the number of the code X (=XXh) made consecutive, e.g. any of "YY01h"–"YYFFh", the horizontal parity checker regards the code (Y, C)="YYFFh" as a single code X="XXh" to be included in a parity computation only when the number indicated by the code C is odd (e.g. "FFh" of "YYFFh"). When the number indicated by the code C is even (e.g. "02h" of "YY02h"), the horizontal parity checker does not include the code (Y, C)="YY02h" in the parity computation.

This is because even number of same codes do not influence a computation result in the horizontal parity computation of the frame data before the code conversion, so that only when the same code is made consecutive odd number times, the computation including the single code (where maximum even number of codes which do not influence the computation result are removed from odd number of codes) has only to be performed.

It is to be noted that the code "YY00h" obtained by converting the code "YYh" in the above-mentioned (2) is regarded as a code made consecutive odd number times so that the parity computation including a single "YYh" is performed.

Thus, even after the code conversion, checking the transmitting data to which the horizontal parity computation is performed before the code conversion can be performed efficiently.

(5) Also, the frame transmitting device according to the present invention may further comprise an empty pattern adder for inserting a code indicating an empty pattern into an empty area in an available bandwidth of a transmission line transmitting the transmitting data.

Namely, in the presence of an empty available bandwidth area in the transmission line for transmitting the transmitting data, an empty pattern adder can insert a code indicating an empty pattern into this area.

Thus, whether or not the data in the available bandwidth are transmitting data can be easily determined.

(6) Also, the frame transmitting device according to the present invention may further comprise a data converter for converting the code indicating the empty pattern into a code at a time of a transmission line disconnection.

Namely, the data converter converts the empty pattern into a code value inputted at the receiving side at the time of the transmission line disconnection.

Thus, the code received at the time of the transmission line disconnection is prevented from being regarded as an ordinary code. Moreover, while it is possible to make the empty pattern itself the code at the time of the transmission line disconnection without using the data converter, it becomes possible to arbitrarily set the empty pattern without being bound to the code at the time of the transmission line disconnection specific to the device by using the data converter.

(7) Also, the frame transmitting device according to the present invention may further comprise a code conversion value setter for setting the codes X and Y.

Namely, it is possible to set a code conversion value setter so that the codes X and Y may be designated in the code converter.

Thus, an arbitrary setting of a code to be converted is made possible.

(8) Also, the frame transmitting device according to the present invention may further comprise a data conversion value setter for setting the code at the time of the transmission line disconnection.

Namely, it becomes possible for a data conversion value setter to set the code at the time of the transmission line disconnection specific to the device in the data converter.

(9) Also, a frame receiving device according to the present invention comprises: a frame decomposer for recognizing a specific n-bit code X as a frame boundary to decompose receiving data; and a code converter for converting (n+m)-bit codes (Y, A) and (Y, B) within the receiving data composed of a specific n-bit code Y, where "n" is a natural number $\geq 2$ and at least specific m-bit codes A and B different from each other, where "m" is a natural number $\geq 1$, respectively into at least different specific n-bit codes X and Y.

Namely, a frame decomposer determines a boundary of receiving data transmitted from e.g. the above-mentioned frame transmitting device (1) based on the boundary code X (e.g.00h) to extract the receiving data. The code converter reads n bits of the extracted data to be outputted in the form of the original code when the code is neither a code X nor Y. When the code is Y and the subsequent m-bit code is A, the code converter converts an (n+m)-bit code (Y, A) into an n-bit code X.

Also, when the code is Y and the subsequent m-bit code is B, the code converter converts the code (Y, B) into an n-bit code Y.

Thus, it becomes possible to take out the receiving data from the frame and to perform a code inversion without assembling a capsule, thereby enabling the line efficiency to be improved.

Also, it is possible to convert codes (Y, A)–(Y, B) composed of a specific code Y and equal to or more than three specific codes A-B respectively into specific codes X-Y. Thus, it becomes possible to distinguish special data other than the frame boundary from the receiving data.

(10) Also, in the frame receiving device according to the present invention, the code converter may extract an m-bit code C from an (n+m)-bit code (Y, C), and may convert the code (Y, C) into the code X made consecutive "i" times corresponding to the code C.

This will be described referring to FIG. 1. The code converter having received a 16-bit code (Y, C)="YY01h" extracts an 8-bit code C="01h", finds the number of code X made consecutive, "1", and converts the code (Y, C) into "XXh".

Similarly, the converter converts codes "YY02h", . . . , "YYFFh" respectively into codes "XXXXh", . . . , "XX . . . XXh (XXh made consecutive 255 times)".

Thus, it becomes possible to invert the code converted at e.g. the code converter in the above-mentioned (2).

(11) Also, in the frame receiving device according to the present invention, the code converter may extract an m-bit code D different from the code C, from an (n+m)-bit code (Y, D), and may convert the code (Y, D) into the code Y made consecutive "j" times corresponding to the code D.

The code converter converts e.g. 16-bit codes YY01h–YY7Fh respectively into XXh, XXXXh, . . . , XX . . . XXh (XXh made consecutive 127 times) in the above-mentioned (10). However, in the present invention, the code converter converts e.g. 16-bit codes YY80h–YYFFh respectively into YYh, YYYYh, . . . , YY . . . YYh (YYh made consecutive 128 times).

Thus, it becomes possible to invert the code converted at e.g. the code converter in the above-mentioned (3).

(12) Also, the frame receiving device according to the present invention may further comprise a horizontal parity checker for regarding the code (Y, C) as the code X itself to be included in a parity computation only when the code C of the code (Y, C) within the receiving data indicates an odd number.

Namely, the frame receiving device can be provided with the same horizontal parity checker as that of the above-mentioned (4).

Thus, it becomes possible to check the receiving data after the code conversion in the frame receiving device.

(13) Also, the frame receiving device according to the present invention may further comprise an empty pattern deleting portion for deleting a code indicating an empty pattern within the receiving data.

Thus, an empty pattern can be deleted, so that invalid data are prevented from being received.

(14) Also, the frame receiving device according to the present invention may further comprise a data converter for converting a code at a time of a transmission line disconnection within the receiving data into a code indicating an empty pattern.

Namely, the data converter converts a code inputted at a time of a transmission line disconnection into a code indicating an empty pattern.

Thus, it becomes possible to prevent an invalid code inputted at the time of the transmission line disconnection from being regarded as a valid code and from being received endlessly.

(15) Also, the frame receiving device according to the present invention may further comprise a code conversion value setter for setting the codes X and Y.

Namely, a code conversion value setter sets the codes X and Y in the code converter.

Thus, it becomes possible to arbitrarily set the code converter so that a code conversion may be performed corresponding to the codes X and Y included in the receiving data.

(16) Also, the frame receiving device according to the present invention may further comprise a data conversion value setter for setting the code at the time of the transmission line disconnection.

Namely, a data conversion value setter sets the code at the time of the transmission line disconnection in the data converter.

Thus, it becomes possible to set the code at the time of the transmission line disconnection specific to the device corresponding to the device.

BRIEF DESCRIPTION OF THE DRAWINGS

FIG. 1 is a diagram showing an example of a code conversion in a frame transmitting device according to the present invention;

FIG. 2 is a diagram showing an example of a code conversion in a frame receiving device according to the present invention;

FIGS. 18A–18C are diagrams showing an encapsulation of a frame in a prior art frame transmitting device.

Throughout the figures, like reference numerals indicate like or corresponding components.

DESCRIPTION OF THE EMBODIMENTS

Figure 3:
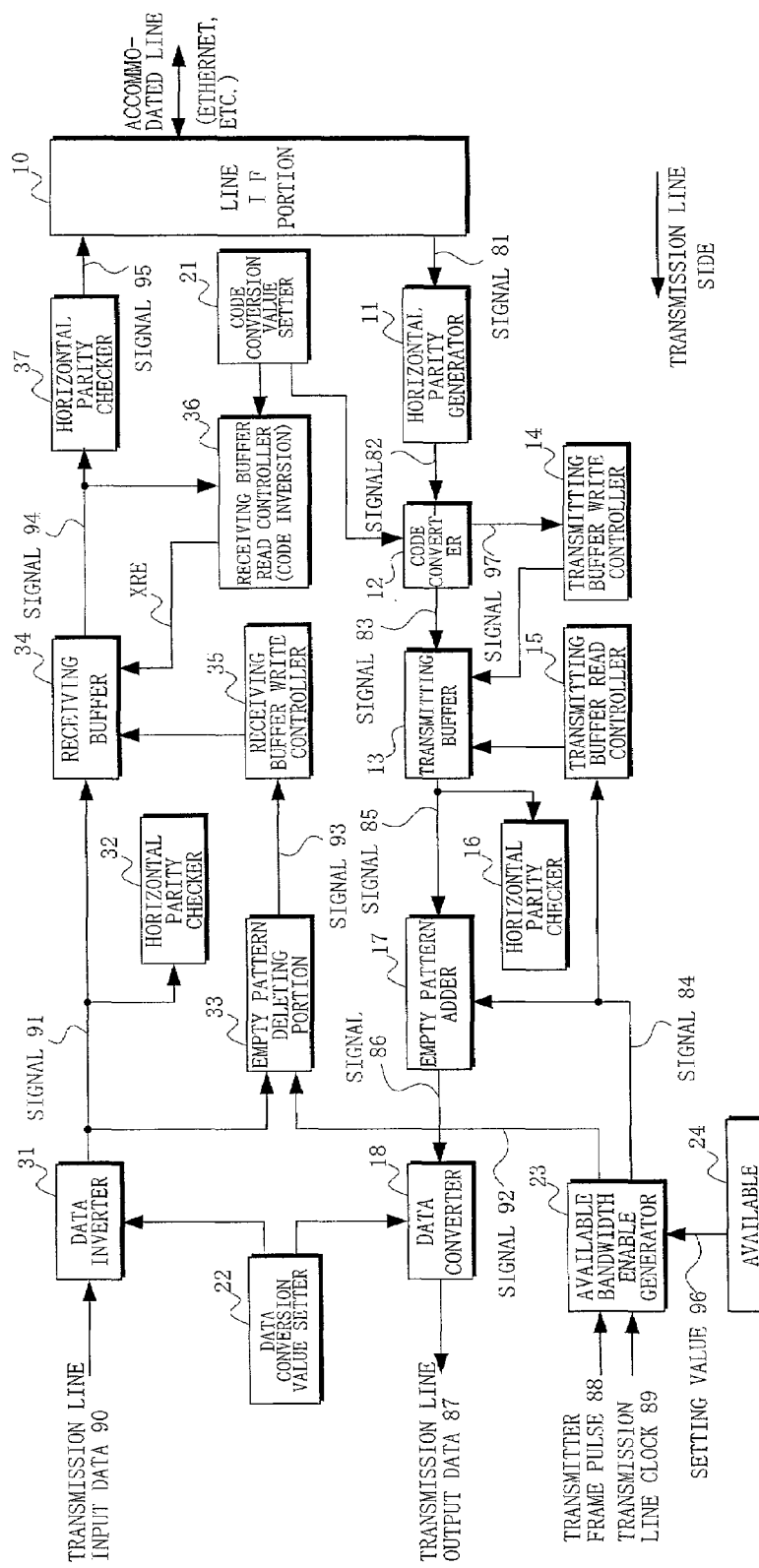
FIG. 3 is a block diagram showing an embodiment of a frame transmitting device and a frame receiving device according to the present invention.

FIG. 3 shows an embodiment of a frame communication system according to the present invention. This system mutually changes frames between an Ethernet and an SDH/SONET, etc.

A line IF portion 10 connected to an accommodated line such as an Ethernet, a horizontal parity generator 11, a code converter 12, a transmitting buffer 13, an empty pattern adder 17, and a data converter 18 which outputs transmission line output data 87 to the SDH or the like are connected in cascade to compose a main portion of a frame transmitting device.

The transmitting buffer 13 is connected to input signals output from a transmitting buffer write controller 14 connected to the code converter 12 and a transmitting buffer read controller 15, and to provide an output signal to a horizontal parity checker 16.

A data inverter 31 having received transmission line input data 90 from the SDH/SONET or the like, a receiving buffer 34, a horizontal parity checker 37, and the line IF portion 10 are connected in cascade to compose a main portion of a frame receiving device.

The receiving buffer 34 is connected to input an output signal of a receiving buffer read controller 36 connected to the output terminal of the receiving buffer 34 and an output signal of a receiving buffer write controller 35 having inputted a signal 93 from an empty pattern deleting portion 33 having inputted a signal 91 from the data inverter 31.

Also, an available bandwidth enable generator 23 having inputted a transmitter frame pulse 88 and a transmission line clock 89 is composed to be connected to provide output signals 84 and 92 to the empty pattern adder 17, the empty pattern deleting portion 33, and the transmitting buffer read controller 15, to control a write/read timing between the SDH/SONET, etc.

Also, a code conversion value setter 21 is connected to the code converter 12 and the receiving buffer read controller (code inversion) 36. A data conversion value setter 22 is connected to the data converter 18 and the data inverter 31. An available bandwidth setter 24 is connected to the available bandwidth enable generator 23 to perform various settings.

Figure 4:
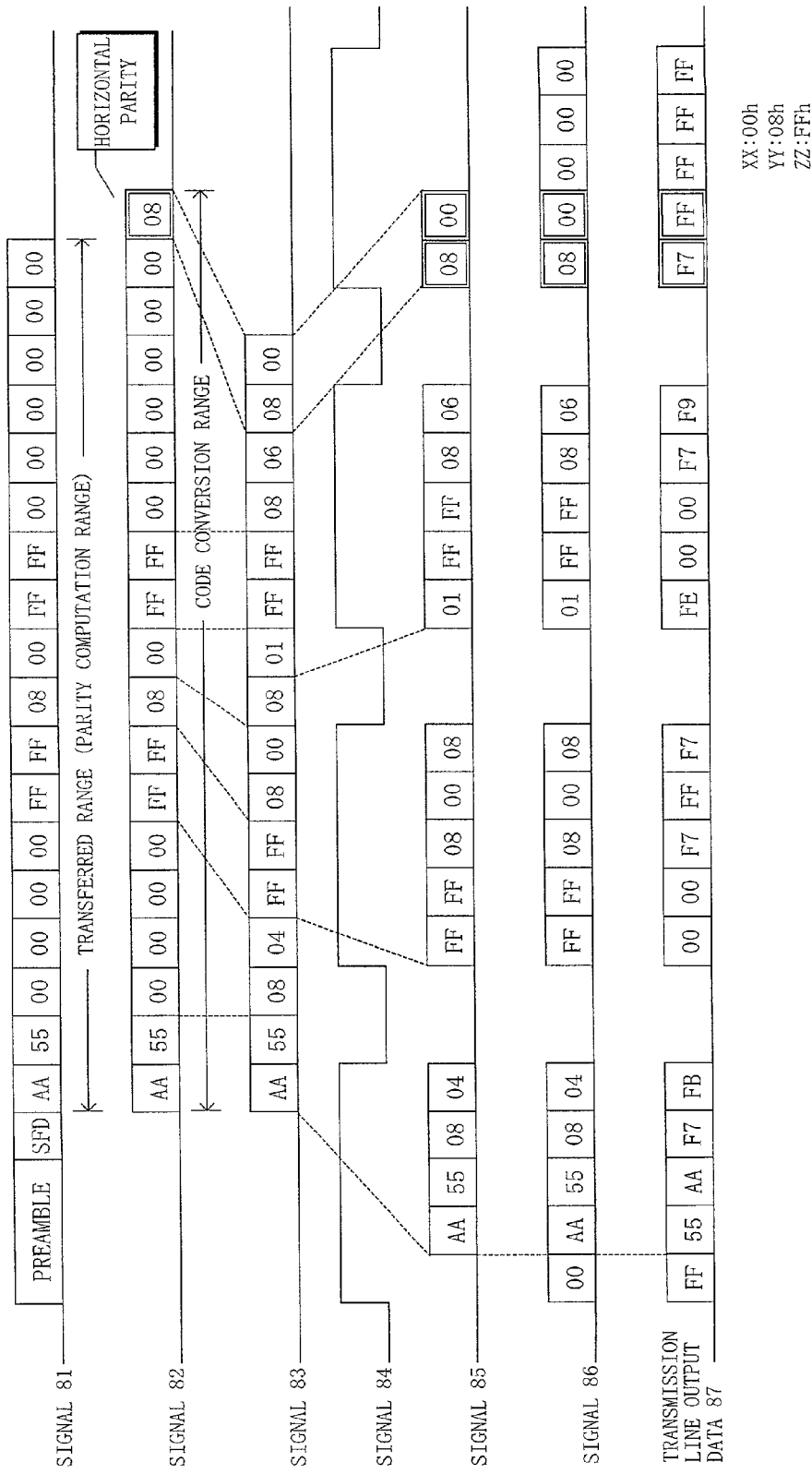
FIG. 4 is a time chart showing an operation example of a frame transmitting device according to the present invention.

FIG. 4 shows a signal example of a frame transmitting operation of transmitting a frame from an accommodated line side to a transmission line side. Hereinafter, a transmitting operation of FIG. 3 will be firstly described referring to FIG. 4.

The line IF portion 10 receives a variable length frame through an electrical interface with an accommodated line to be converted into an NRZ signal (see signal 81 of FIG. 4).

The horizontal parity generator 11 performs an odd horizontal parity computation to data ("transferred range" of signal 81) in FIG. 4 where a preamble and an SFD (Start Frame Delimiter) are deleted from a variable length frame, so that the computation result "08" is added to the data (signal 82 in FIG. 4).

The code converter 12 is required to convert a "00h" code in the data (code conversion range of signal 82) into another code in order to add a frame boundary code="00h". For this reason, in this embodiment, the XXh (frame boundary code) shown in FIG. 1 is made "00h", and the code conversion of YYh="08h" is performed. These codes "00h" and "08h" are set in the code converter 12 by the code conversion value setter 21.

The code converter 12 outputs the codes other than "00h" and "08h" in the data, e.g. codes "AAh", "55h", "FFh" as they are, converts the code "08h" into a code "0800h" and the code "00h" into a code "0801h" to be outputted, and converts e.g. codes "00000000h" and "000000000000h" where the code "00h" is made consecutive respectively into codes "0804h" and "0806h" to be outputted (signal 83 in FIG. 4).

The transmitting buffer write controller 14 writes the converted code whose write address is designated (hereinafter, occasionally referred to as conversion code) based on a timing of a write enable signal 97 from the code converter 12 in the transmitting buffer 13.

Figure 19:
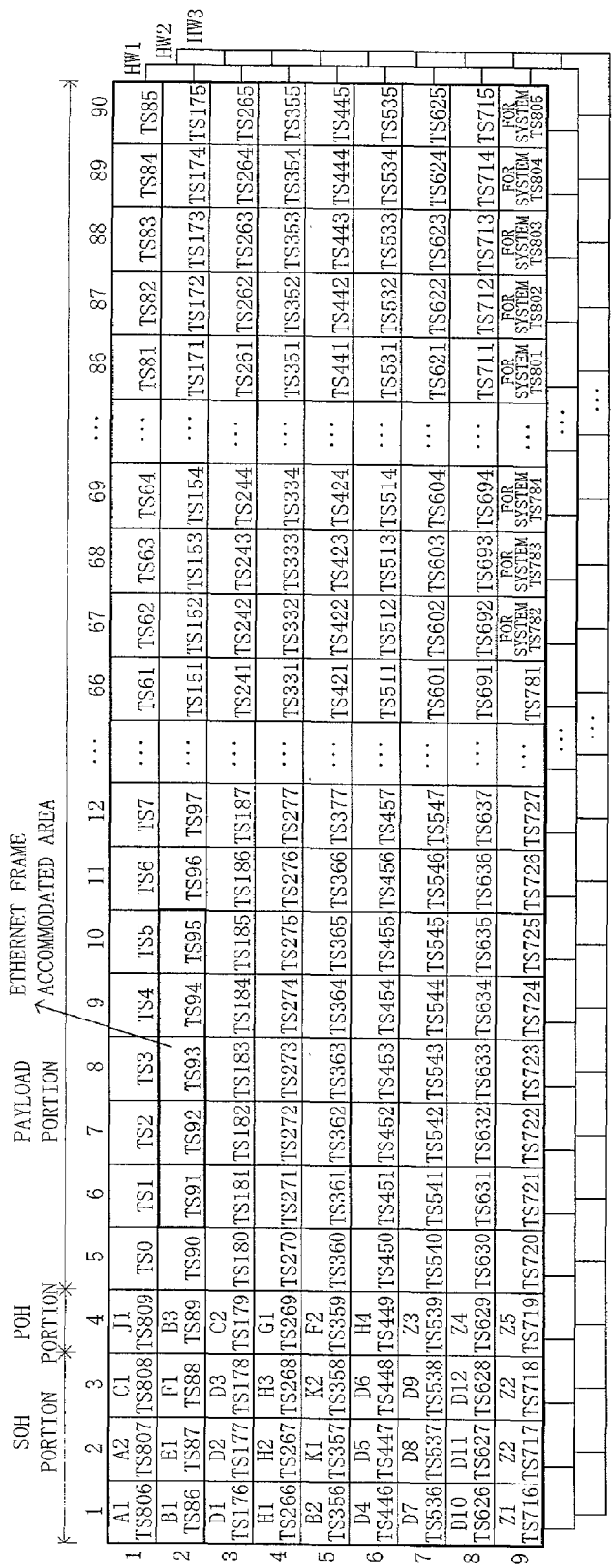
FIG. 19 is a diagram showing an SDH frame example accommodating a general Ethernet frame.

The available bandwidth enable generator 23 provides the enable signal 84 indicating the write timing to the available bandwidth (=accommodated area of FIG. 19) designated by the available bandwidth setter 24 based on the transmitter frame pulse 88 and the transmission line clock 89.

The transmitting buffer read controller 15 provides the read address to the transmitting buffer 13 at a read timing based on the signal 84, so that the transmitting buffer 13 outputs the conversion code (signal 85 of FIG. 4).

The horizontal parity checker 16 checks the conversion code (see FIG. 2).

The empty pattern adder 17 adds the boundary code="00h" to the front and back of the conversion code, and adds an empty pattern code="00h" to the available bandwidth without codes to output the signal 86.

It is to be noted that the empty pattern adder 17 also serves as the above-mentioned frame generator. In addition, although the same code "00h" is used as a boundary code and an empty pattern code, different codes can be used.

The data converter 18 performs a data conversion to convert the empty pattern code "00h" designated by the data conversion value setter 22 into a value indicating the time of the transmission line disconnection, e.g. "FFh" to the signal 86, and outputs the transmission line output data 87.

Figure 5:
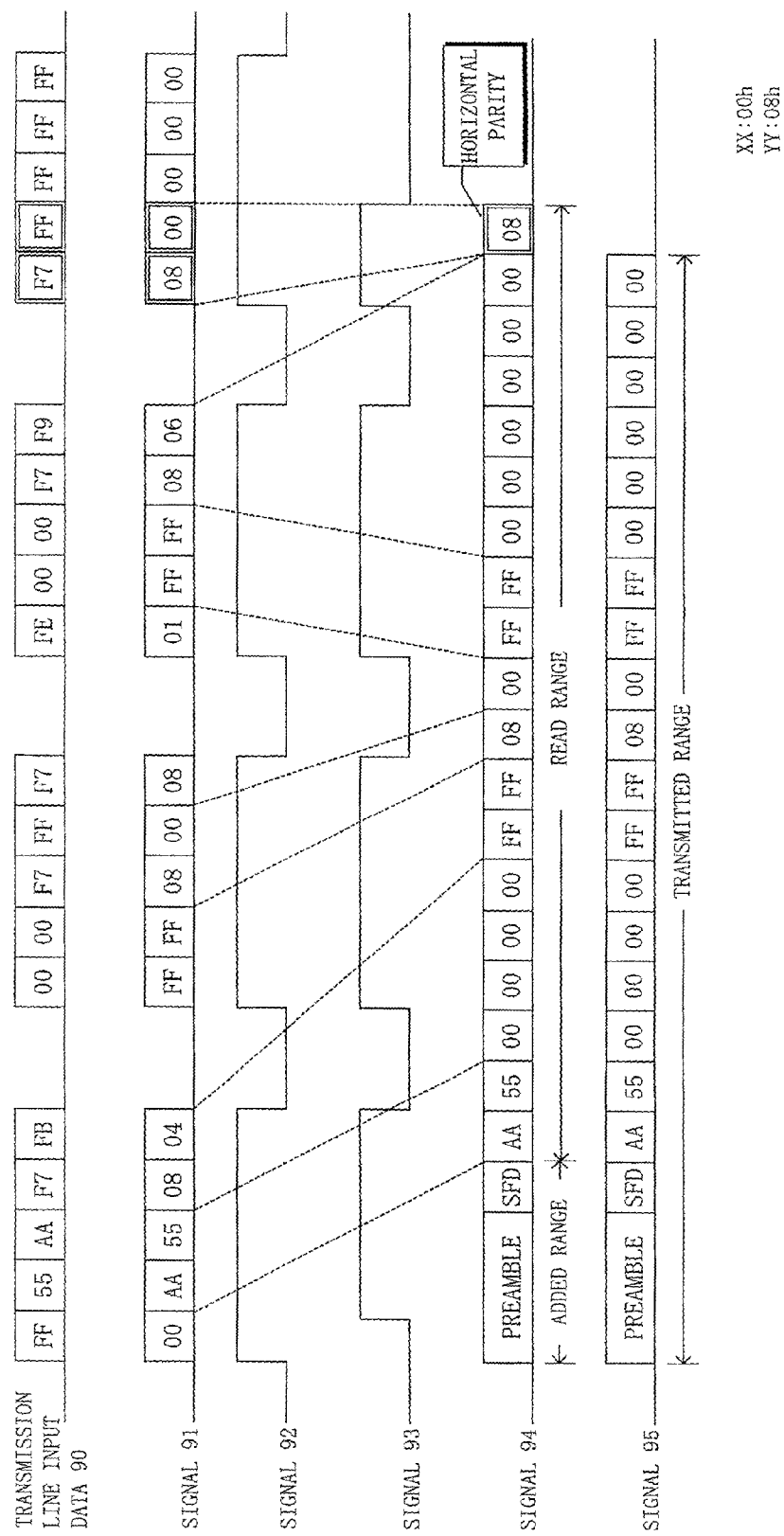
FIG. 5 is a time chart showing an operation example of a frame receiving device according to the present invention.

FIG. 5 shows a signal example of a frame receiving operation in which a frame received from the transmission line side is transmitted to the accommodated line side. Hereinafter, the receiving operation of FIG. 3 will be described referring to FIG. 5.

The data inverter 31 receives the transmission line input data 90 (the same as the transmission line output data 87 of FIG. 4), performs an inversion to the transmission line input data 90 in order to return the code upon the transmission line disconnection designated by the data conversion value setter 22 to the empty pattern code "00h", and outputs the signal 91.

The horizontal parity checker 32 checks the signal 91.

The empty pattern deleting portion 33 generates the timing signal 93 that is a timing signal 92 of a designated range designated by the available bandwidth enable generator 23, from which the timings of the boundary code and the empty pattern code "00h" are deleted, and provides the timing signal 93 to the receiving buffer write controller 35.

It is to be noted that the empty pattern deleting portion 33 also serves as the above-mentioned frame decomposer.

The controller 35 provides a write address to the receiving buffer 34 based on the signal 93, so that the receiving buffer 34 stores the data portion (including a parity check code) of the signal 91.

The receiving buffer read controller 36 inverts the data portion based on the codes "00h" and "08h" from the code conversion value setter 21 to data portion indicated by a "read range" of a signal 94. Furthermore, the receiving buffer read controller 36 outputs the signal 94 where a preamble and an SFD are added to the data portion.

The horizontal parity checker 37 checks the data portion, and transmits a signal 95, where the check bit "08h" is deleted, to the accommodated line through the line IF portion 10.

Figure 6:
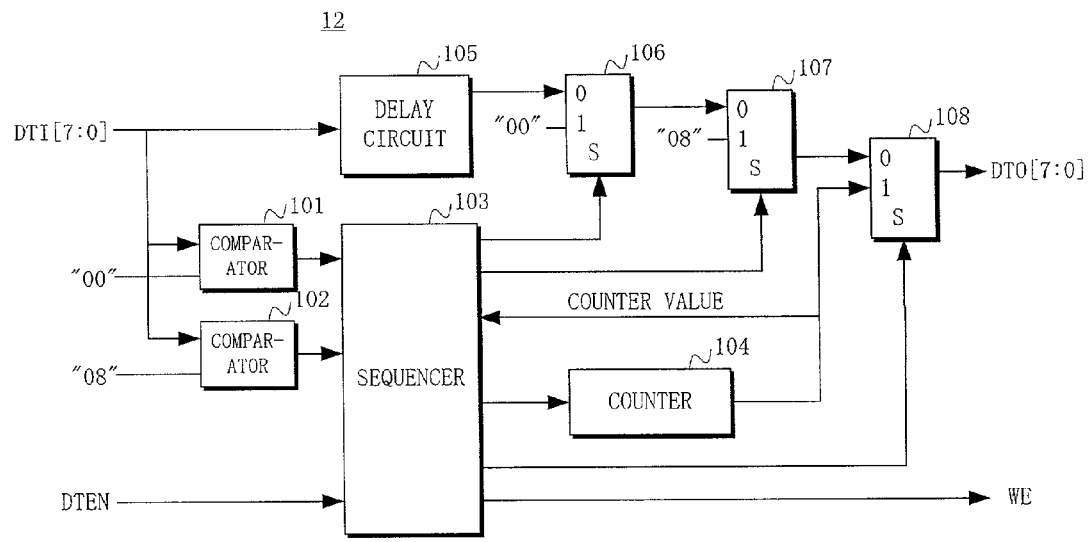
FIG. 6 is a block diagram showing an arrangement of a code converter in a frame transmitting device according to the present invention.

FIG. 6 shows an arrangement of the code converter 12 shown in FIG. 3. The code converter 12 is composed of comparators 101 and 102 for inputting 8-bit input data DTI[7:0] (see signal 82 in FIG. 3) to be respectively compared with the codes "00h" and "08h", a sequencer 103 for inputting a comparison result of the comparators 101 and 102 and a data enable signal DTEN and for outputting a write enable signal WE (signal 97 of FIG. 3), and a counter 104 for counting based on the instructions from the sequencer 103.

Furthermore, the code converter 12 includes a delay circuit 105 for outputting data having delayed the input data DTI, a selector 106 for selecting delay data or a code "00" based on a selection signal from the sequencer 103, a selector 107 for selecting the output data of the selector 106 or the code "08", and a selector 108 for selecting the output data of the selector 107 or the counter 104 to provide the output data DTO[7:0] (signal 83 in FIG. 6).

Figure 7:
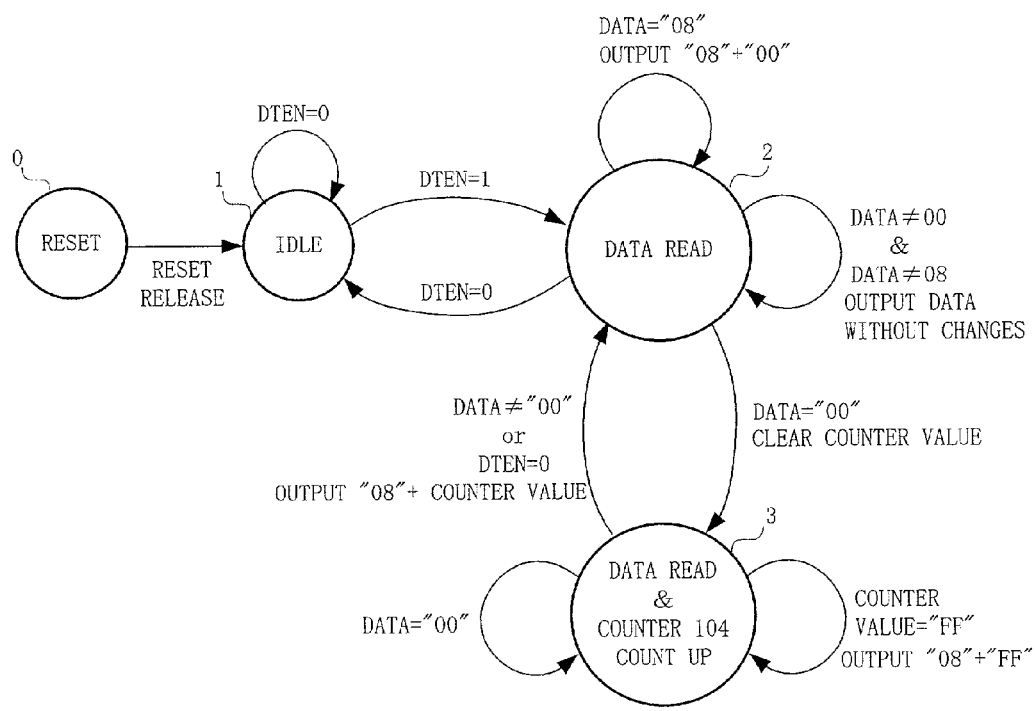
FIG. 7 is a state transition diagram showing an operation example of a code converter in a frame transmitting device according to the present invention.

Hereinafter, the operation of a sequencer 103 will be described referring to a state transition diagram of FIG. 7.

The sequencer 103 is in a reset state 0 as an initial state. When the reset state is released, the sequencer 103 changes from the reset state 0 to an idle state 1.

When the signal DTEN=0 in the state 1, the sequencer 103 holds the state 1. When the signal changes to the signal DTEN=1 (timing when valid data are inputted), the state of the sequencer 103 is changed to a data read state 2. In the state 2, the sequencer 103 receives a notification of the code="08" of the input data DTI from the comparator 102, and transmits the selection signals to the selectors 106–108 so that the codes "08" and "00" may be sequentially outputted as output data DTO.

When receiving the notification of the code≠"00" and "08" of the input data DTI respectively from the comparators 101 and 102, the sequencer 103 maintains the state 2 and transmits the selection signals to the selectors 106–108 so that the output data of the delay circuit 105 may be outputted as they are.

Also, when the signal DTEN=0, the sequencer 103 changes from the state 2 to the idle state 1.

When receiving the notification of the code="00" of the input data DTI from the comparator 101, the sequencer 103 clears the counter 104, changes to a state 3 of data read & count up, and counts up the counter 104 by 1.

When the code="00" in the state 3, the sequencer 103 increments the counter 104 by 1. When the counter value is "FF", the sequencer 103 transmits selection signals respectively to the selectors 106–108 in order to sequentially output "08" and "FF", and increments the counter 104 to "00".

When the code≠"00" or the signal DTEN="0", the sequencer 103 transmits the selection signals respectively to the selectors 106–108 in order to sequentially output "08" and "counter value", and then the sequencer 103 changes to the state 2.

Figure 8:
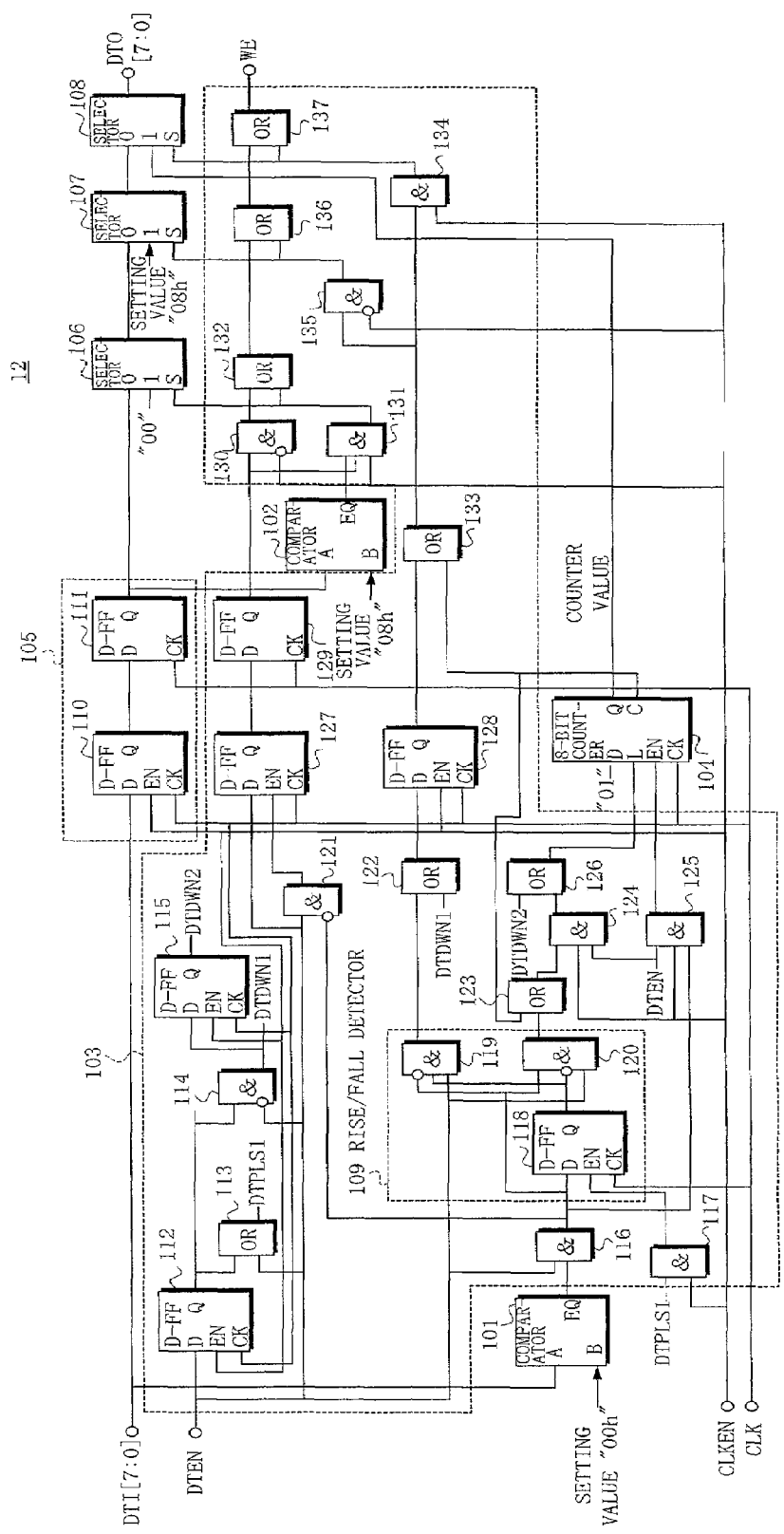
FIG. 8 is a block diagram showing detailed arrangement of a code converter in a frame transmitting device according to the present invention.

FIG. 8 shows an arrangement of the code converter 12 shown in FIG. 6 in more detail.

The block portions 103 and 105 enclosed with dotted lines in FIG. 8 respectively correspond to the sequencer 103 and the delay circuit 105 in FIG. 6. The comparators 101 and 102, the counter 104, and the selectors 106–108 in FIG. 8 respectively correspond to those having the same reference numerals shown in FIG. 6. Also, the delay circuit 105 is composed of 8-bit D-FF circuits 110 and 111. It is to be noted that the block portion 103 has an arrangement different from that of the sequencer in FIG. 6.

Figure 9:
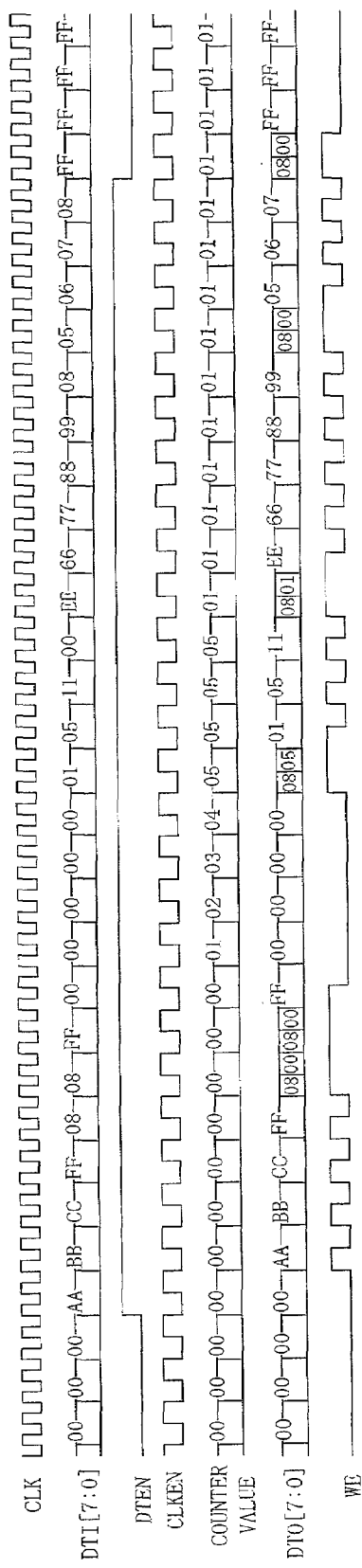
FIG. 9 is a time chart showing an operation example of a code converter in a frame transmitting device according to the present invention.

FIG. 9 shows an operation timing example of the code converter 12 in FIG. 8.

Hereinafter, the operation of FIG. 8 will be described referring to FIG. 9.

A clock signal CLK is a synchronizing clock for the code converter in its entirety. What the frequency of the clock signal CLK is divided into 2 is a clock enable signal CLKEN. Input data DTI, output data DTO, a data enable signal DTEN, and a write enable signal WE respectively correspond to the DTI, the DTO, the DTEN, and the WE shown in FIG. 6.

The signal DTEN indicates the timing when the valid transmitting data are outputted to the output terminal of the input data DTI. This signal DTEN is prepared based on the code X (="00h") indicating the frame boundary.

A D-FF circuit 112 and an OR circuit 113 prepare a signal DTPLS1 that is a signal DTEN extended by 2 clock (CLK) signals (=1 signal (CLKEN)) backward. An AND (&) circuit 114 prepares a signal DTDWN1 indicating the last 2 clocks of the signal DTPL1. A D-FF circuit 115 prepares a signal DTDWN2 where the signal DTDWN1 is delayed for 2 clocks.

The code converter 12 performs an operation in synchronization with the clock signal CLK, the clock enable signal CLKEN, and the signals DTPL1, DTDWN1, DTDWN2. Hereinafter, a detailed description of the synchronous timing will be omitted.

The 8-bit input data DTI other than "00h" are delayed for 2 clock (CLK signals at the delay circuit 105, and then are outputted as 8-bit output data DTO through the selectors 106–108 (see signals DTI and DTO in FIG. 9).

The write enable signal WE is a timing signal for writing the output data DTO in the transmitting buffer 13 (see FIG. 3), and is prepared as follows: The circuit composed of the comparator 101, and the AND circuits 116, 121 outputs a timing signal in which the codes other than "00h" in the valid input data are outputted. The D-FF circuits 127 and 129 delay the timing signal for 2 clock signals The AND circuit 130, and the OR circuits 132, 136, 137 output an inversion signal of the signal CLKEN only at the delayed timing. This output signal is a write enable signal WE.

Also, the input data DTI of "08h" is detected at the comparator 102 after being delayed for 2 clock signals (D-FF circuits 110 and 111), and "00h" is outputted at a timing for 1 clock signal after outputting the code "08h" for 1 clock (AND circuit 131 and selector 106), and the timing is outputted to the signal WE (OR circuits 132, 136, and 137). Namely, by the conversion of the codes other than "00h" and the output of "00h" mentioned above, the code "08h" is now converted into the code "0800h".

Hereinafter, a code conversion operation of consecutive "00h" data will be described.

A rise/fall detector 109 composed of the D-FF circuit 118, and the AND circuits 119 and 120 detects a rise where the input data DTI has assumed "00h" (output of the AND circuit 116) when the signal DTEN is "1", and a fall where the input data DTI has not assumed "00h" firstly after this rise at the AND circuit 119.

The counter 104 is set to "01" at the timing of the rise of the "00h" and the signal DTDWN2 (Or circuits 123 and 126, and AND circuit 124). The counter 104 counts the "00h" (comparator 101, and AND circuits 116 and 125) within the input data DTI, and output its "counter value".

When 2 clocks elapse after "00h" has changed to a different code (AND circuit 119, OR circuit 122, D-FF circuit 128, and OR circuit 133), "08h" is firstly outputted (AND circuit 135 and selector 107). Furthermore, after 1 clock, the "counter value" is outputted (AND circuit 134 and selector 108).

At this time, the timing when the "008" and the "counter value" are outputted is outputted to the signal WE (AND circuit 135, OR circuit 136, AND circuit 134, and OR circuit 137).

It is to be noted that when "00h" is made consecutive "FFh" times (carry signal C="1" in the counter 104), "008" and the counter value="FFh" are similarly outputted (OR circuit 133, AND circuit 135, selector 107, AND circuit 134, and selector 108), and the counter 104 is initialized to "01h" (OR circuit 123, AND circuit 124, and OR circuit 126).

Similarly, the timing of outputting "08h" and the counter value="FFh" is outputted to the signal WE (OR circuit 133, the above-mentioned AND circuit 135, OR circuit 136, AND circuit 134, and OR circuit 137).

Thus, the consecutive "00h" is converted into ""08h"+ "code indicating the number"".

Also, after 2 clocks from the signal DTDWN1="1" (OR circuit 122 and D-FF circuit 128), ""08h"+counter value" is outputted.

Figure 10:
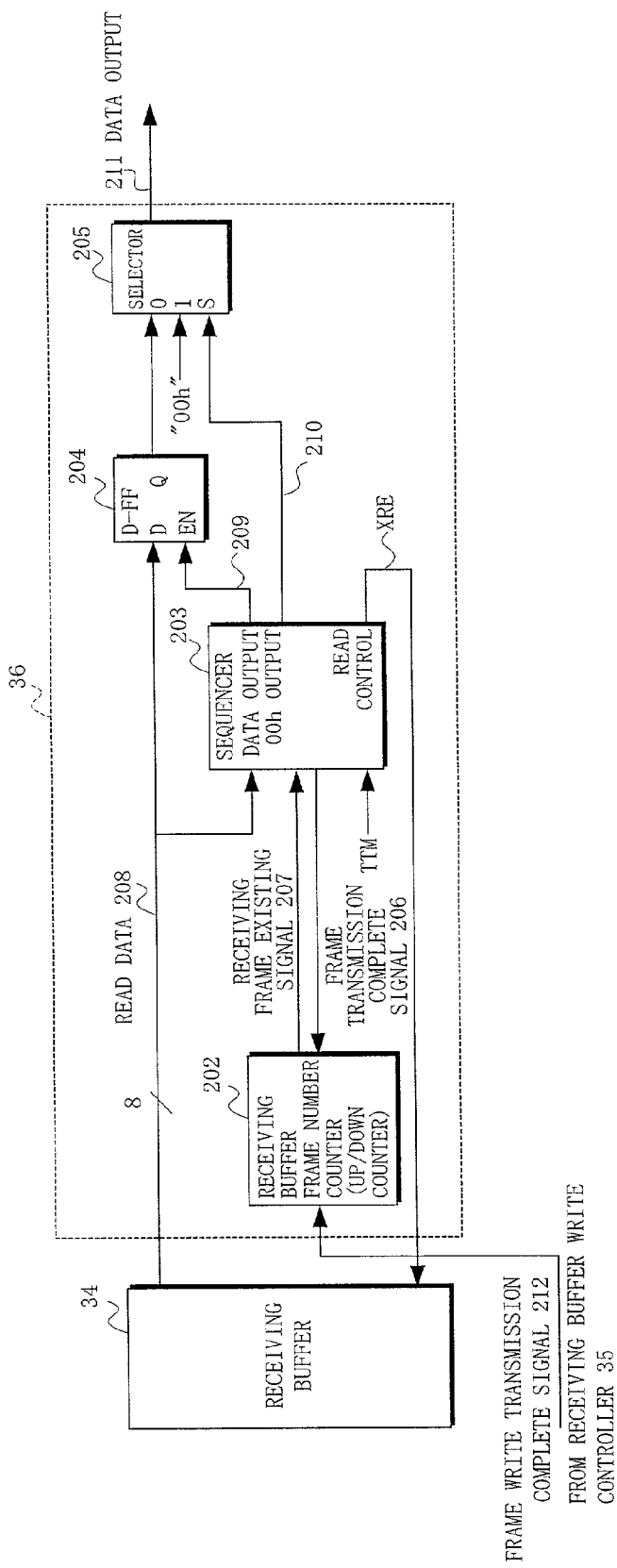
FIG. 10 is a block diagram showing an arrangement of a code converter in a frame receiving device according to the present invention.

FIG. 10 shows an arrangement of the receiving buffer read controller (code inverter) 36 shown in FIG. 3. FIG. 10 also shows the receiving buffer 34 to make it easier to understand a relation with the code inverter 36.

The receiving buffer read controller 36 is composed of a receiving buffer frame number counter (up/down counter) 202 for inputting a frame write complete signal 212 from the receiving buffer write controller 35, a sequencer 203 for inputting a synchronous signal TTM, for respectively transmitting/receiving a frame transmission complete signal 206 and a receiving frame existing signal 207 to/from the counter 202, and for respectively transmitting/receiving a read control signal XRE and 8-bit read data 208 to/from the receiving buffer 34, a D-FF circuit 204 for receiving the read data 208 from the receiving buffer 34 and for receiving a data output signal 209 from the sequencer 203, and a selector 205 for inputting the data "00h" and the output data from the D-FF circuit 204 and for inputting a 00h-output signal 210 from the sequencer 203 and outputting data output 211.

It is to be noted that the frame write complete signal 212 is not shown in FIG. 3.

In operation, the receiving buffer write controller 35 (see FIG. 3) provides the frame write complete signal 212 to the counter 202 every time a single frame is written in the receiving buffer 34. The counter 202 is incremented by "1" with the frame write complete signal 212, and decremented by "1" with the frame transmission complete signal 206.

Thus, in the absence of a receiving frame in the receiving buffer 34, the counter value of the counter 202 becomes "0", and otherwise, becomes the value indicating the number of the receiving frame. When the counter value≠"0", the receiving frame existing signal 207 is outputted.

The sequencer 203 sequentially changes the state based on the synchronous signal TTM, the receiving frame existing signal 207, and the read data 208, outputs the data output signal 209, the 00h-output signal 210, and the read control signal XRE, and designates the timing to make the D-FF circuit 204 a latch enable state, the timing when the selector 205 selects "00h" to be outputted, and the timing to make the receiving buffer 34 a read enable state.

Figure 11:
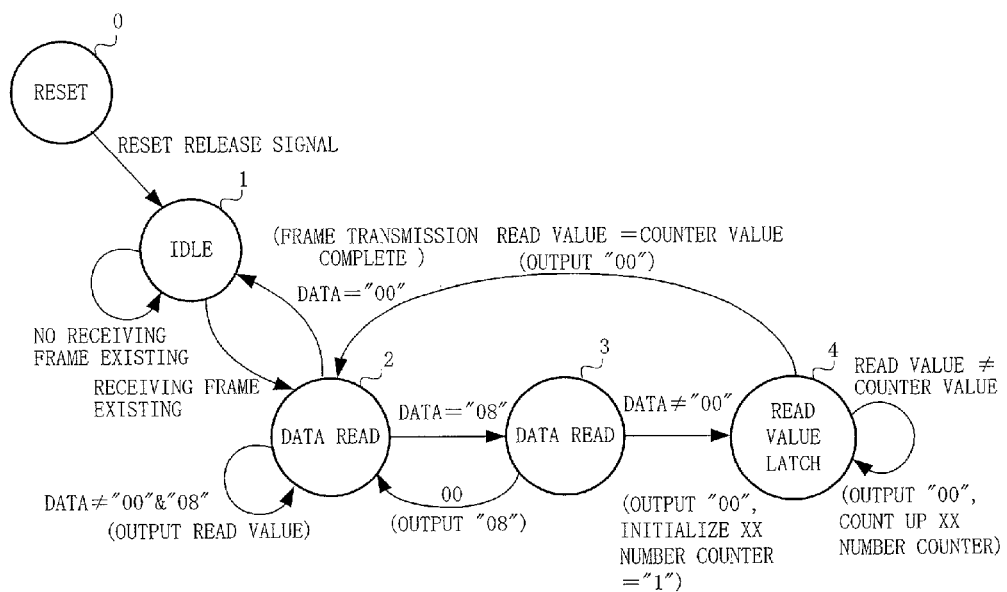
FIG. 11 is a state transition diagram showing an operation example of a code converter in a frame receiving device according to the present invention.
Figure 12:
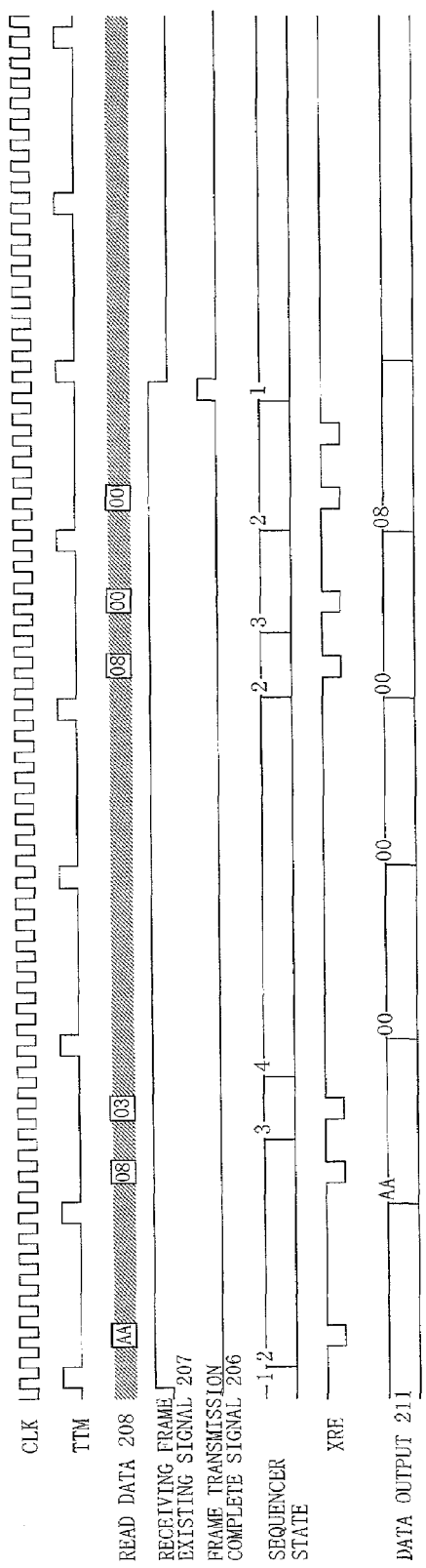
FIG. 12 is a time chart showing an operation example of a code converter in a frame receiving device according to the present invention.

FIG. 11 shows a transition state of the sequencer 203. FIG. 12 shows an operation timing of the receiving buffer read controller 36. Hereinafter, the operation of the receiving buffer read controller 36 in FIG. 10 will be described referring to FIGS. 11 and 12.

The receiving buffer read controller 36 operates in synchronization with the clock signal CLK (omitted in FIG. 10) and the signal TTM that is the clock signal CLK whose frequency is divided into 8.

In FIG. 11, the state of the sequencer 203 changes from a reset state 0 to an idle state 1 with a reset release signal (omitted in FIG. 10). In case the receiving frame existing signal 207="0" in this state 1, the state 1 is maintained. In case the receiving frame existing signal 207="1", the state of the sequencer 203 changes to a data read state 2.

When inputting e.g. the read data 208="AAh" in the state 2, the sequencer 203 determines that "AAh" is neither "08h" nor "00h", and outputs the data output signal 209 and the 00h-output signal 210 as an "enable" signal and a "signal not selecting "00h"", respectively.

As a result, the read data 208="AAh" are outputted at the timing of the subsequent signal TTM as the data output 211 through the D-FF circuit 204 and the selector 205.

Also, when inputting e.g. the read data 208="08h" in the state 2, the sequencer 203 changes to a data read state 3. Furthermore, when inputting the read data 208="01h" in this state 3, the sequencer 203 determines that "01h" is not "00h", and sets an XX (=00h) number counter (omitted in FIG. 10) to the initial value "1", and changes to a read value latch state 4.

In the state 4, the sequencer 203 determines that the read value "01h"=the XX number counter value "01h", makes the 00h-output signal 210 "select "00h"" to be provided to the selector 205. Then the sequencer 203 outputs the data output signal 211="00h", and returns to the state 2.

When inputting the read data 208="03h" instead of "01h" in the state 3, the sequencer 203 determines that this "03h" is not "00h", sets the XX (=00h) number counter to the initial value "1", and change to the read value latch state 4. Hereafter, determining that the read value "03h"≠the XX number counter value "01h", the sequencer 203 makes the XX number counter "02h" by incrementing by "1", outputs the "00h", and returns to the same state 4.

Since the read value "03h"≠the XX number counter value "02h" in this state 4, the sequencer 203 further outputs the "00h", and increments the XX number counter by "1" and returns to the same state 4 with the "03h".

As a result, the read value "03h"=the XX number counter value "03h". The sequencer 203 outputs the "00h" and returns to the state 2.

Thus, the equal number of "00h" to the read value "03h" is finally outputted. Namely, a code "0803h" is now converted into a code "000000h" to be outputted.

Also, when the read data 208="00h" are inputted in the state 3, the sequencer 203 makes the data output signal 209 "disable" in order to hold "08h" in the D-FF circuit 204, makes the 00h-output signal 210="not select 00h", outputs "08h" to the data output signal 211, and returns to the state 2.

As a result, a code "0800h" is now converted into "08h" to be outputted.

Furthermore, when the read value "00h (boundary code)" is inputted in the state 2, the sequencer 203 provides the frame transmission complete signal 206 to the receiving buffer frame number counter 202, decrements the counter 202 by "1", returns to the state 1, and completes the code inversion for a single frame.

In case "receiving frame exists" in the state 1, the same operation as the above-mentioned operation is repeated until the time when "no receiving frame exists".

It is to be noted that when 2 consecutive read values "00h's=(boundary codes)" are inputted in the state 2 depending on a change of a state transition condition, it is possible to shift to the state 1 and complete a code inversion for a single frame (see signal 91 in FIG. 5).

Figure 13:
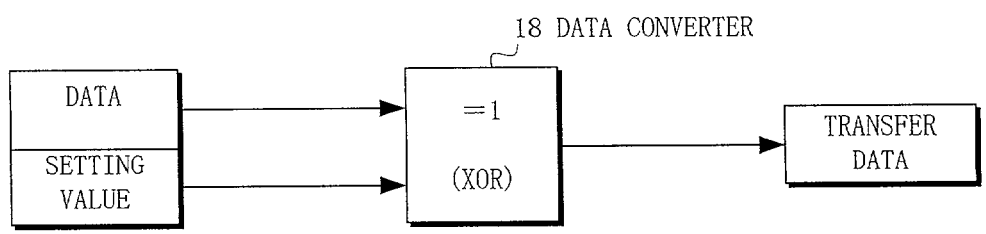
FIG. 13 is a block diagram showing an embodiment of a data converter in a frame transmitting device according to the present invention.

FIG. 13 shows an embodiment of the data converter 18 shown in FIG. 3. This data converter 18 is composed of an XOR circuit, computes an exclusive logical sum with inputted data and a setting value set by the data conversion value setter 22 of FIG. 3, and outputs the transfer data (transmission line output data 87).

If the input data="01h" and the setting value="FEh (inversion of 01h)", for example, the transfer data "FFh" are outputted.

Thus, the data converter 18 can convert e.g. the empty code "01h" to the "FFh" outputted at the time of the transmission line disconnection.

Figure 14:
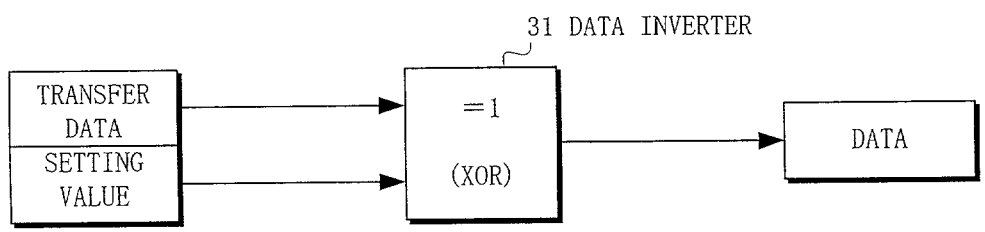
FIG. 14 is a block diagram showing an embodiment of a data converter in a frame receiving device according to the present invention.
Figure 15:
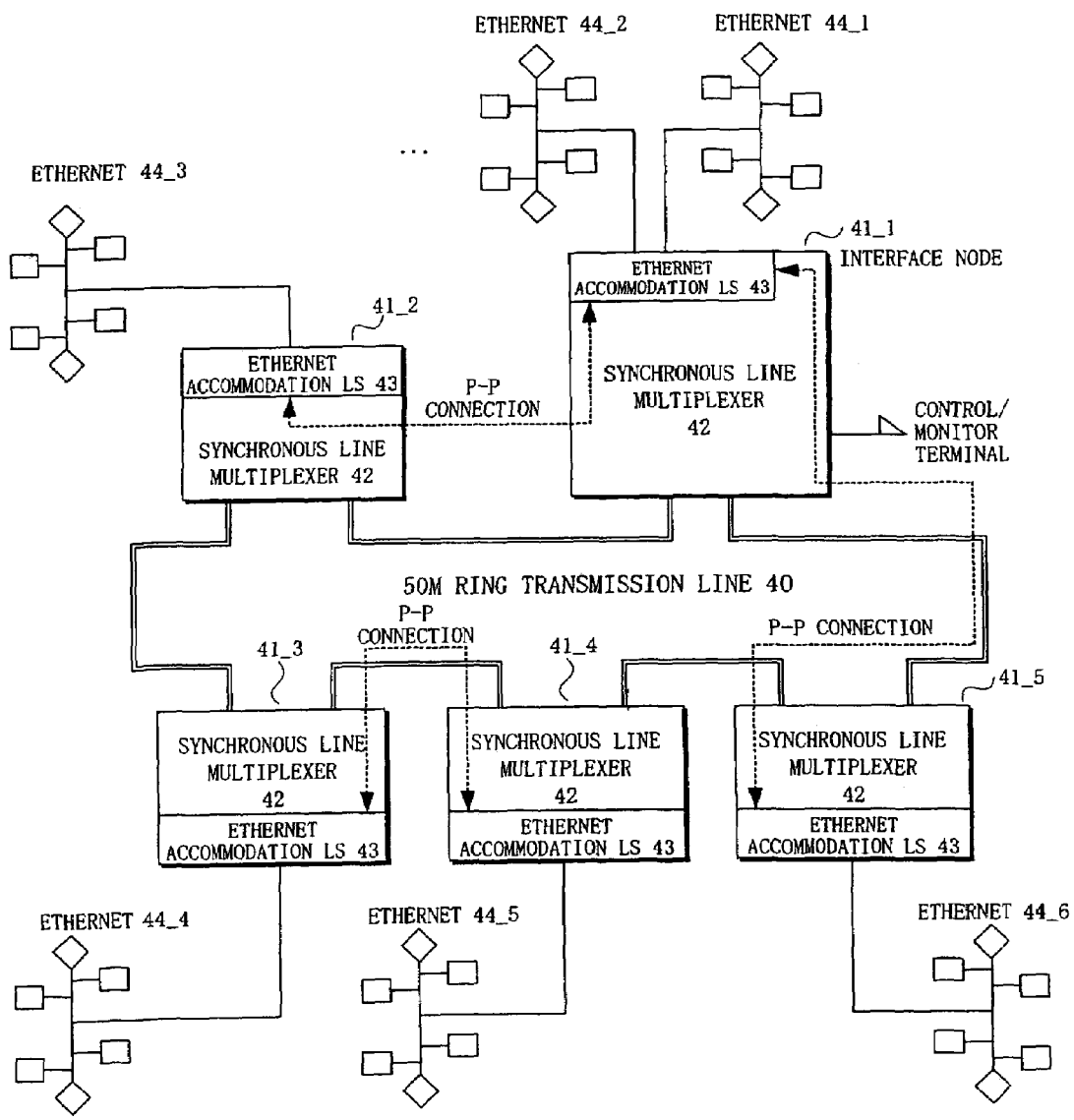
FIG. 15 is a block diagram showing an arrangement of a general ring-like system.
Figure 16:
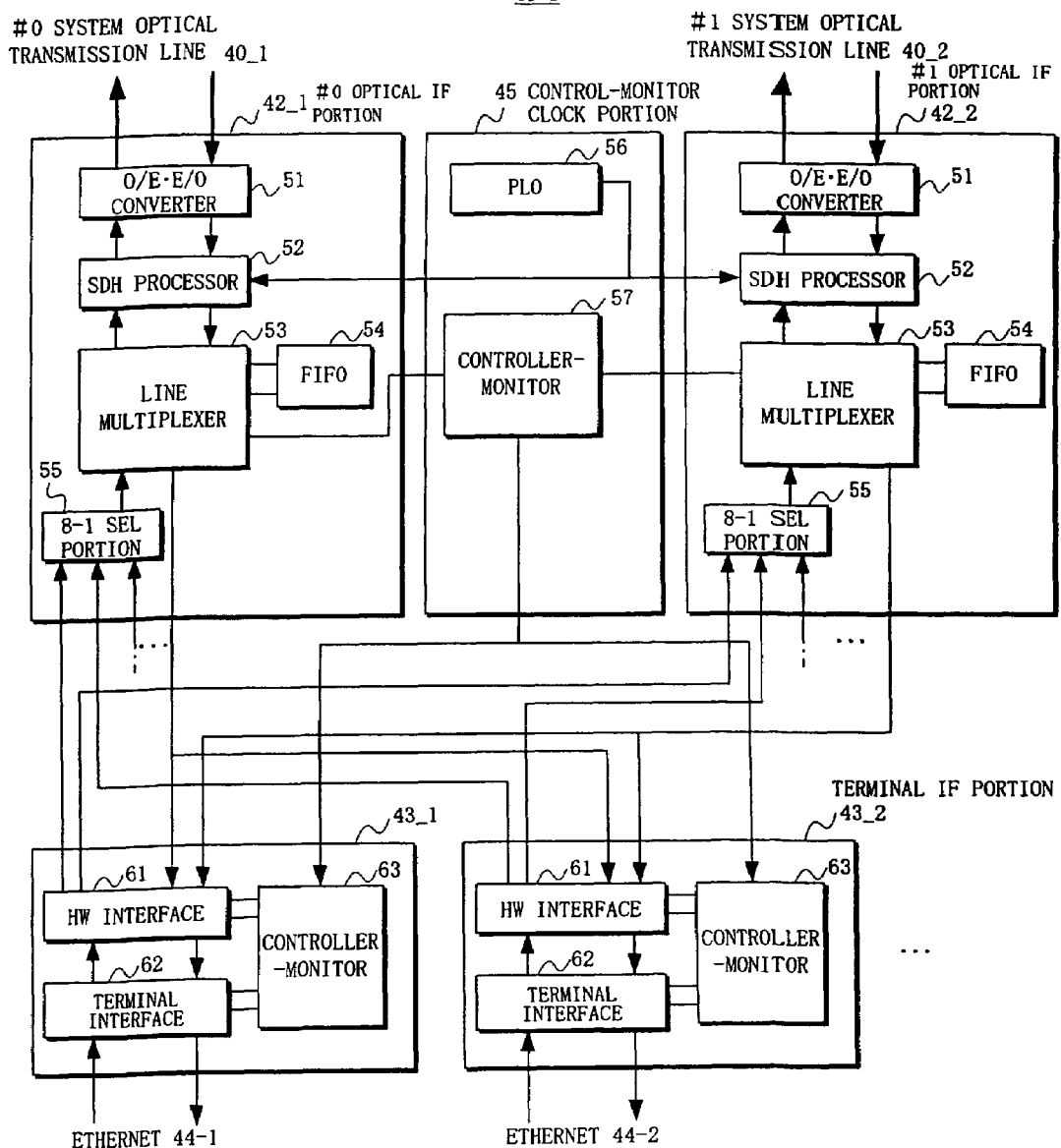
FIG. 16 is a block diagram showing an arrangement of a general interface node.
Figure 17:
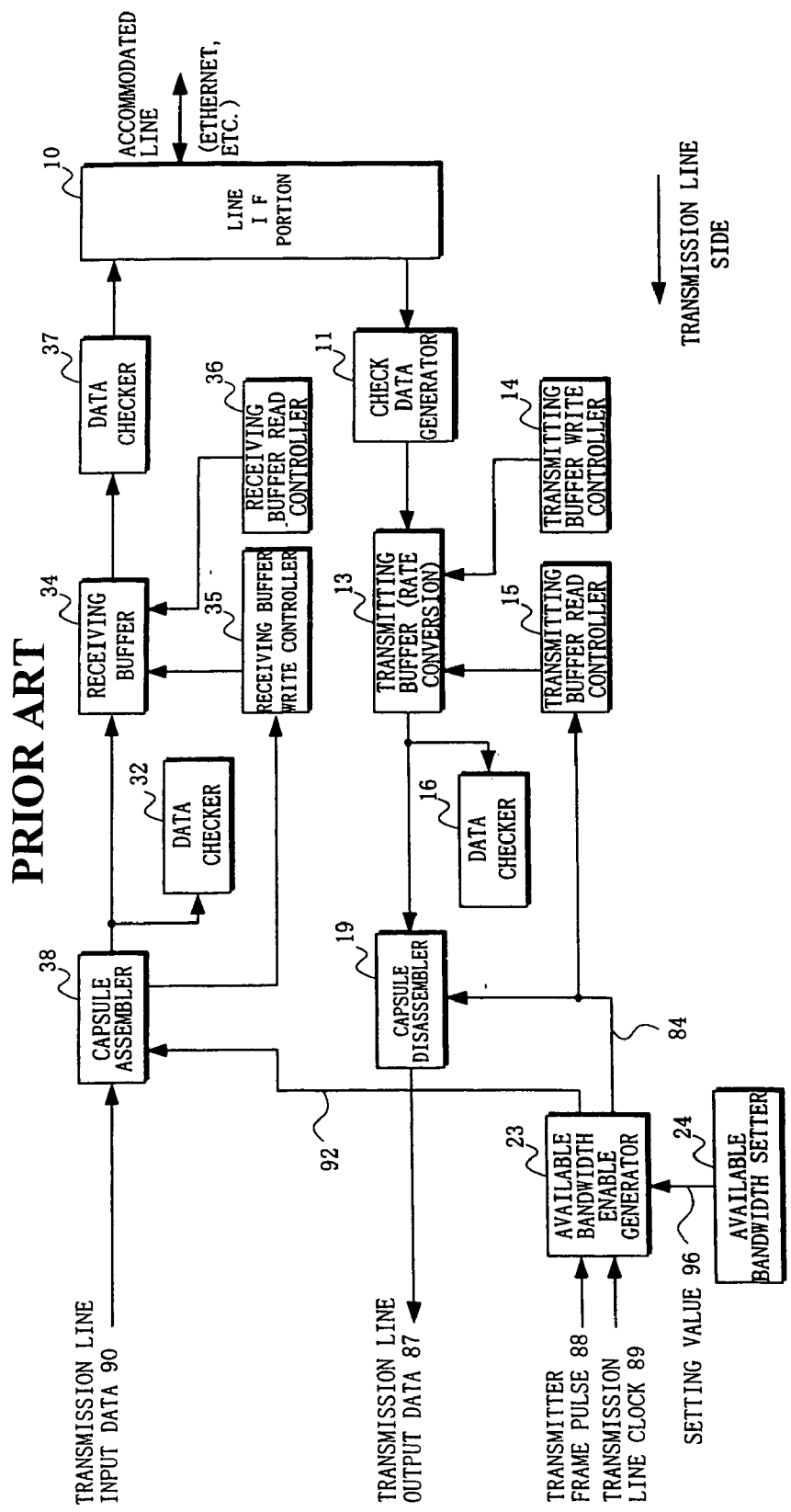
FIG. 17 is a block diagram showing an arrangement of a prior art frame transmitting device and receiving device.

FIG. 14 shows an embodiment of the data inverter 31 shown in FIG. 3. This data inverter 31 is also composed of an XOR circuit, and computes an exclusive logical sum of the transfer data (transmission line input data 90) and a setting value set by the data conversion value setter 22 to output the data (signal 91).

If the transfer data="FFh", and the setting value="FEh", for example, the data "01h" are outputted. Thus, it is avoided to recognize the "FFh" inputted at the time of the transmission line disconnection as the empty data, and to receive frames endlessly.

As described above, a frame communication system according to the present invention is arranged such that a code converter on a transmitting side converts at least different specific codes X and Y within transmitting data respectively into codes (Y, A) and (Y, B) composed of the code Y and at least specific codes A and B different from each other, a frame generator prepares a frame of the transmitting data with the code X as a frame boundary, a frame decomposer on a receiving side recognizes a specific code X as a frame boundary to decompose receiving data, and a code converter converts codes (Y, A) and (Y, B) within the receiving data composed of a specific code Y and specific codes A and B into codes X and Y. Therefore, it becomes possible to improve a line efficiency without encapsulation.

Also, if the communication system according to the present invention is arranged such that the code converter on the transmitting side converts the code X made consecutive "i" times included in the transmitting data into a code (Y, C) composed of the code Y and a code C corresponding to the number "i", and the code converter on the receiving side converts a code (Y, C) into the code X made consecutive "i" times corresponding to a code C, a compression effect of the code X can be expected by converting e.g. the highest available frequency code into the code X, and the lowest available frequency code into the code Y. Also, it becomes possible to make a transmitting/receiving buffer capacity small, and to increase the line efficiency.

Also, if the communication system according to the present invention is arranged such that only when the code C after the code conversion indicates an odd number, a horizontal parity checker regards the code (Y, C) as the code X itself to perform a parity computation, a parity check can be performed to the data after the code conversion.

Furthermore, if the communication system according to the present invention is arranged such that the data converter converts a value of an empty pattern of an available bandwidth of a transmission line to adjust to a value of a transmission line disconnection, a malfunction of recognizing data inputted to a receiving side at the time of the transmission line disconnection as valid data can be avoided.

What we claim is:

1. A frame transmitting device comprising:
    a code converter for converting at least different specific codes X and Y within transmitting data composed of n-bit codes, where "n" is a natural number≧2, respectively into codes (Y, A) and (Y, B) composed of the code Y and at least specific m-bit codes A and B different from each other, where "m" is a natural number≧1; and
    a frame generator for preparing a frame of the transmitting data with the code X as a frame boundary.

2. The frame transmitting device as claimed in claim 1 wherein when the code X is made consecutive "i" times, where "i" is a natural number≧1, the code converter converts the code X into a code (Y, C) composed of the code Y and an m-bit code C corresponding to the number "i".

3. The frame transmitting device as claimed in claim 2 wherein when the code Y is made consecutive "j" times, where "j" is a natural number≧1, the code converter converts the code Y into a code (Y, D) composed of the code Y and an m-bit code D corresponding to the number "j" other than the code C.

4. The frame transmitting device as claimed in claim 2, further comprising:
    a horizontal parity generator for adding horizontal parity to the transmitting data before a code conversion; and
    a horizontal parity checker for regarding the code (Y, C) as the code X itself to be included in a parity computation only when the code C after the code conversion indicates an odd number.

5. The frame transmitting device as claimed in claim 1, further comprising an empty pattern adder for inserting a code indicating an empty pattern into an empty area in an available bandwidth of a transmission line transmitting the transmitting data.

6. The frame transmitting device as claimed in claim 5, further comprising a data converter for converting the code indicating the empty pattern into a code at a time of a transmission line disconnection.

7. The frame transmitting device as claimed in claim 1, further comprising a code conversion value setter for setting the codes X and Y.

8. The frame transmitting device as claimed in claim 6, further comprising a data conversion value setter for setting the code at the time of the transmission line disconnection.

9. A frame receiving device comprising:
    a frame decomposer for recognizing a specific n-bit code X as a frame boundary to decompose receiving data; and
    a code converter for converting (n+m)-bit codes (Y, A) and (Y, B) within the receiving data composed of a specific n-bit code Y, where "n" is a natural number≧2 and at least specific m-bit codes A and B different from each other, where "m" is a natural number≧1, respectively into at least different specific n-bit codes X and Y.

10. The frame receiving device as claimed in claim 9 wherein the code converter extracts an m-bit code C from an (n+m)-bit code (Y, C), and converts the code (Y, C) into the code X made consecutive "i" times corresponding to the code C.

11. The frame receiving device as claimed in claim 10 wherein the code converter extracts an m-bit code D different from the code C, from an (n+m)-bit code (Y, D), and converts the code (Y, D) into the code Y made consecutive "j" times corresponding to the code D.

12. The frame receiving device as claimed in claim 10, further comprising a horizontal parity checker for regarding the code (Y, C) as the code X itself to be included in a parity computation only when the code C of the code (Y, C) within the receiving data indicates an odd number.

13. The frame receiving device as claimed in claim 9, further comprising an empty pattern deleting portion for deleting a code indicating an empty pattern within the receiving data.

14. The frame receiving device as claimed in claim 9, further comprising a data converter for converting a code at a time of a transmission line disconnection within the receiving data into a code indicating an empty pattern.

15. The frame receiving device as claimed in claim 14, further comprising a data conversion value setter for setting the code at the time of the transmission line disconnection.

16. The frame receiving device as claimed in claim 9, further comprising a code conversion value setter for setting the codes X and Y.

* * * * *